(12) United States Patent
Van Phan et al.

(10) Patent No.: US 10,980,065 B2
(45) Date of Patent: Apr. 13, 2021

(54) MULTI-CONNECTIVITY OF TERMINAL DEVICE

(71) Applicant: Nokia Technologies Oy, Espoo (FI)

(72) Inventors: Vinh Van Phan, Oulu (FI); Ling Yu, Kauniainen (FI); Peter Rost, Heidelberg (DE)

(73) Assignee: Nokia Technologies Oy, Espoo (FI)

( * ) Notice: Subject to any disclaimer, the term of this patent is extended or adjusted under 35 U.S.C. 154(b) by 135 days.

(21) Appl. No.: 16/305,182

(22) PCT Filed: Jun. 7, 2016

(86) PCT No.: PCT/FI2016/050403
§ 371 (c)(1),
(2) Date: Nov. 28, 2018

(87) PCT Pub. No.: WO2017/212104
PCT Pub. Date: Dec. 14, 2017

(65) Prior Publication Data
US 2020/0214041 A1 Jul. 2, 2020

(51) Int. Cl.
*H04W 74/08* (2009.01)
*H04W 76/15* (2018.01)
*H04W 48/14* (2009.01)

(52) U.S. Cl.
CPC ....... *H04W 74/0833* (2013.01); *H04W 48/14* (2013.01); *H04W 76/15* (2018.02)

(58) Field of Classification Search
None
See application file for complete search history.

(56) References Cited

U.S. PATENT DOCUMENTS

| 9,357,460 B2 | 5/2016 | Yamada |
| 2014/0056243 A1 | 2/2014 | Pelletier et al. |

(Continued)

FOREIGN PATENT DOCUMENTS

| EP | 3499785 A1 | 6/2019 | |
| WO | WO-2014126569 A1 * | 8/2014 | ........... H04B 7/0632 |

(Continued)

OTHER PUBLICATIONS

Extended European Search Report received for corresponding European Patent Application No. 16904528.3, dated Mar. 3, 2020, 7 pages.

(Continued)

*Primary Examiner* — Alex Skripnikov
(74) *Attorney, Agent, or Firm* — Brake Hughes Bellermann LLP

(57) ABSTRACT

This document discloses a solution for providing a terminal device with a multi-connectivity service. According to an aspect, a method comprises: determining, autonomously by a terminal device of a wireless communication system, to request for establishment of parallel connections with multiple access nodes; transmitting, by the terminal device, at least one access request to a plurality of access nodes; and receiving, by the terminal device at least one response to the at least one access request from at least one radio access node, wherein the response contains information related to establishment of the parallel connections.

18 Claims, 5 Drawing Sheets

(56) References Cited

U.S. PATENT DOCUMENTS

| | | | |
|---|---|---|---|
| 2014/0335869 A1* | 11/2014 | Choi | H04W 40/36 |
| | | | 455/438 |
| 2015/0223212 A1 | 8/2015 | Der Velde et al. | |
| 2016/0021581 A1* | 1/2016 | Deenoo | H04W 36/0055 |
| | | | 370/331 |
| 2016/0095154 A1 | 3/2016 | Palm et al. | |
| 2016/0183323 A1* | 6/2016 | Rahman | H04W 72/042 |
| | | | 370/329 |
| 2016/0227575 A1* | 8/2016 | Furuskog | H04W 16/28 |

FOREIGN PATENT DOCUMENTS

| | | | | |
|---|---|---|---|---|
| WO | WO-2014154245 A1 * | 10/2014 | | H04W 36/0072 |
| WO | 2016/030718 A1 | 3/2016 | | |
| WO | 2016/095078 A1 | 6/2016 | | |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300, V13.3.0, Mar. 2016, pp. 1-295.

International Search Report and Written Opinion received for corresponding Patent Cooperation Treaty Application No. PCT/FI2016/050403, dated Sep. 27, 2016, 14 pages.

* cited by examiner

MULTI-CONNECTIVITY OF TERMINAL DEVICE

TECHNICAL FIELD

The invention relates to wireless communication systems and, in particular, to a solution for multi-connectivity of a terminal device.

BACKGROUND OF THE INVENTION

Cellular communication systems provide a terminal device (or user equipment, UE, or machine type communication, MTC, device) with a communication connection to a radio access network of base stations or access nodes. A conventional solution is to provide the terminal device with a single radio resource connection to a single base station. Some advanced systems provide the terminal device with the connection through multiple component carriers that may be established between the terminal device and a single base station or between the terminal device and multiple base stations. Such expansion to the use of multiple components carriers has been initiated by the radio access network, e.g. by the serving base station.

BRIEF DESCRIPTION OF THE INVENTION

The invention is defined by the subject matter of the independent claims. Some embodiments are defined in the dependent claims.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
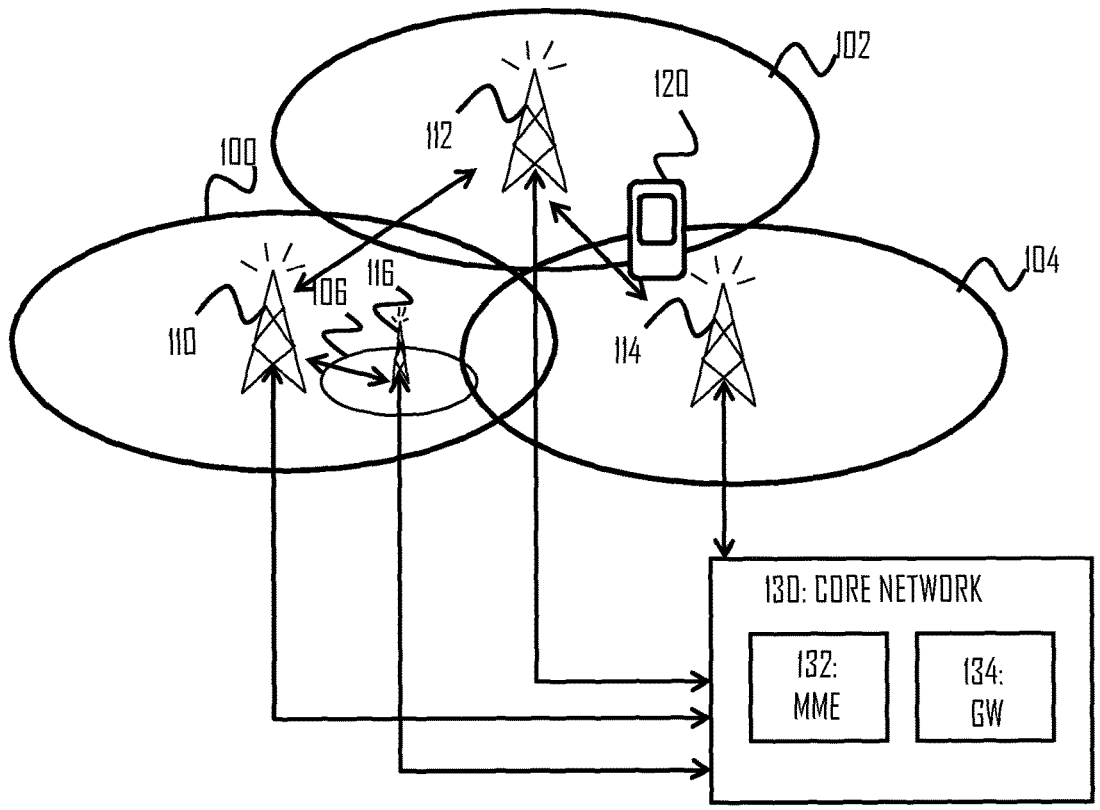
FIG. 1 illustrates a wireless communication scenario to which embodiments of the invention may be applied.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Universal Mobile Telecommunication System (UMTS, 3G) based on basic wideband-code division multiple access (W-CDMA), high-speed packet access (HSPA), Long Term Evolution (LTE), LTE-Advanced, and/or 5G system.

The embodiments are not, however, restricted to the system given as an example but a person skilled in the art may apply the solution to other communication systems provided with necessary properties. One example of a suitable communications system is the 5G system, as listed above. 5G has been envisaged to use multiple-input-multiple-output (MIMO) multi-antenna transmission techniques, many more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum. 5G system may also incorporate both cellular (3GPP) and non-cellular (e.g. IEEE) technologies. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, including apart from earlier deployed frequencies below 6 GHz, also higher, that is cmWave and mmWave frequencies, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as inter-RI operatibility between cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent. Some other technology advancements probably to be used are Software-Defined Networking (SDN), Big Data, and all-IP, which may change the way networks are being constructed and managed.

FIG. 1 illustrates an example of a communication system to which some embodiments of the invention may be applied. The system may comprise access nodes 110, 112, 114, 116 providing and managing respective cells 100, 102, 104, 106. The cell may be, e.g., a macro cell, a micro cell, femto, or a pico cell, for example. From another point of view, the cell may define a coverage area or a service area of the access node. The access node 110 to 116 may be an evolved Node B (eNB) as in the LTE and LTE-A, an access point of an IEEE 802.11-based network (Wi-Fi or wireless local area network, WLAN), or any other apparatus capable of controlling radio communication and managing radio resources within a cell. For 5G solutions, the implementation may be similar to LTE-A, as described above. The access node may be called a base station or a network node. The system may be a wireless communication system composed of a radio access network of access nodes, each controlling a respective cell or cells. The access nodes may provide terminal devices (UEs) 120 with wireless access to other networks such as the Internet. In some scenarios, one or more local area access nodes 116 may be arranged within a control area of a macro cell access node 110. The local area access node 116 may provide wireless access within a sub-cell that may be comprised within a macro cell. Examples of the sub-cell may include a micro, pico and/or femto cell. Typically, the sub-cell provides a hot spot within the macro cell. The operation of the local area access node may be controlled by an access node under whose control area the sub-cell is provided. In some scenarios, a plurality of local area access nodes may be controlled by a single macro cell access node.

In the case of multiple access nodes in the communication network, the access nodes may be connected to each other with an interface illustrated by arrows between the access nodes in FIG. 1. LTE specifications call such an interface as X2 interface. In IEEE 802.11 networks, a similar interface is provided between access points. Other wired or wireless communication methods between the access nodes may also be possible. The access nodes may be further connected via another interface to a core network 130 of the cellular communication system. The LTE specifications specify the core network as an evolved packet core (EPC), and the core network may comprise a mobility management entity (MME) 132 and a gateway (GW) node 134. The MME may handle mobility of terminal devices in a tracking area encompassing a plurality of cells and also handle signalling connections between the terminal devices and the core network 130. The gateway node 134 may handle data routing in the core network 130 and to/from the terminal devices. In some scenarios, the different access nodes may be connected to different core networks, e.g. access nodes 110 and 114 may be connected to different core networks. The different core networks may be operated by the same operator or by different operators.

The radio system of FIG. 1 may support Machine Type Communication (MTC). MTC may enable providing service for a large amount of MTC capable devices, such as the at least one terminal device 120. The at least one terminal device 120 may comprise a mobile phone, smart phone, tablet computer, laptop or other devices used for user communication with the radio communication network, such as an MTC network. These devices may provide further functionality compared to the MTC scheme, such as communication link for voice, video and/or data transfer. However, in MTC perspective the at least one terminal device 120 may be understood as a MTC device. It needs to be understood that the at least one terminal device 120 may also comprise another MTC capable device, such as a sensor device providing position, acceleration and/or temperature information to name a few examples. Some embodiments of the invention may thus be applicable to Internet of Things (IoT) systems, e.g. a radio access technology supporting a narrowband IoT (NB-IoT) communication scheme.

Figure 2:
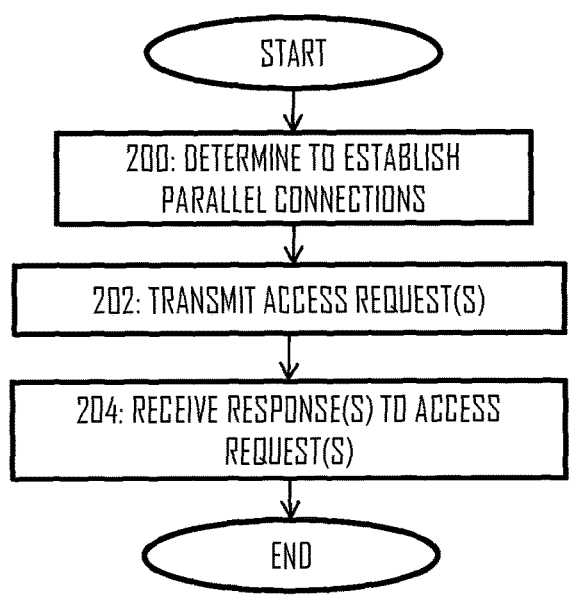
FIGS. 2 and 3 illustrate flow diagram of some embodiments for initiating a multi-connectivity service.
Figure 3:
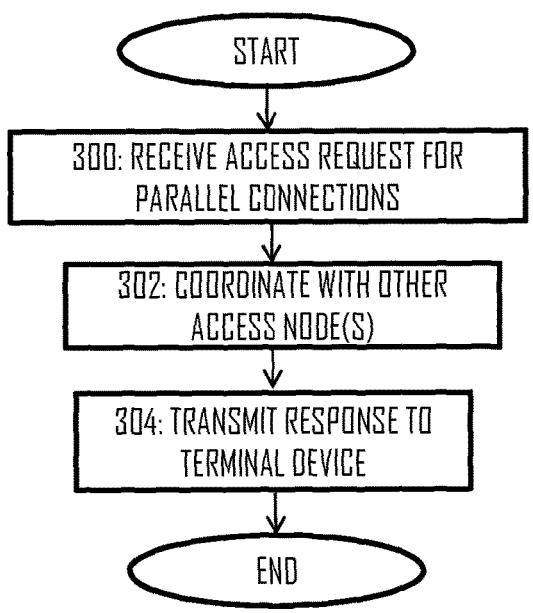

Some embodiments of the invention relate to establishment of multiple parallel radio connections between the terminal device 120 and the access nodes. Each connection may be established with a different access node. Each radio connection may logically differ from the other radio connection(s), e.g. considered as a different radio bearer service. FIGS. 2 and 3 illustrate flow diagrams of processes for initiating the establishment of such multi-connectivity. FIG. 2 illustrates operation of the terminal device 120 and FIG. 3 illustrates operation of an access node, e.g. any one of access nodes 110 to 116.

Referring to FIG. 2, the process comprises in the terminal device: method comprising: determining to establish parallel connections with multiple access nodes (block 200); transmitting at least one access request to a plurality of access nodes (block 202); and receiving (block 204) at least one response to the at least one access request from at least one radio access node.

The determination to establish the parallel connections may be an autonomous decision made by the terminal device, in contrast with some prior art solutions where an access node decides to provide the terminal device with multiple radio connections.

When making the determination in block 200, the terminal device may be in a state where it has no fully configured radio connection with the radio access network. The terminal device may, however, store context parameters of at least one radio connection but remain in an inactive state where the radio connection is not operational. 5G systems have been envisaged to provide such a state where some or even all context parameters of a radio connections are stored in the terminal device and in a serving access node or in the radio access network but the radio connection is not operational, e.g. no signalling or data is transferred between the terminal device and the access node in the inactive state. The inactive state may be a logical state of the system and not just an inactive period in an otherwise operational radio connection, e.g. in a radio resource control connected state of the terminal device.

Referring to FIG. 3, the process comprises in the access node or in an apparatus suitable for the access node: receiving, from a terminal device, an access request for establishing parallel connections to multiple access nodes (block 300); coordinating with one or more access nodes setup of the parallel connections (block 302) and, as a result of the coordination, causing transmission of a response to the terminal device (block 304).

The embodiments of FIGS. 2 and 3 enable the terminal device to initiate the multi-connectivity with the access nodes of the cellular communication system. This is a fundamental difference with respect to the solution described in the Background because the terminal device makes the decision from a different perspective than an access node or another network element of the radio access network or the core network.

In an embodiment, the multi-connectivity service may be logically divided into a control plane service and a user plane (data) service, and the terminal device may be provided either one or both services as the multi-connectivity service.

Figure 4:
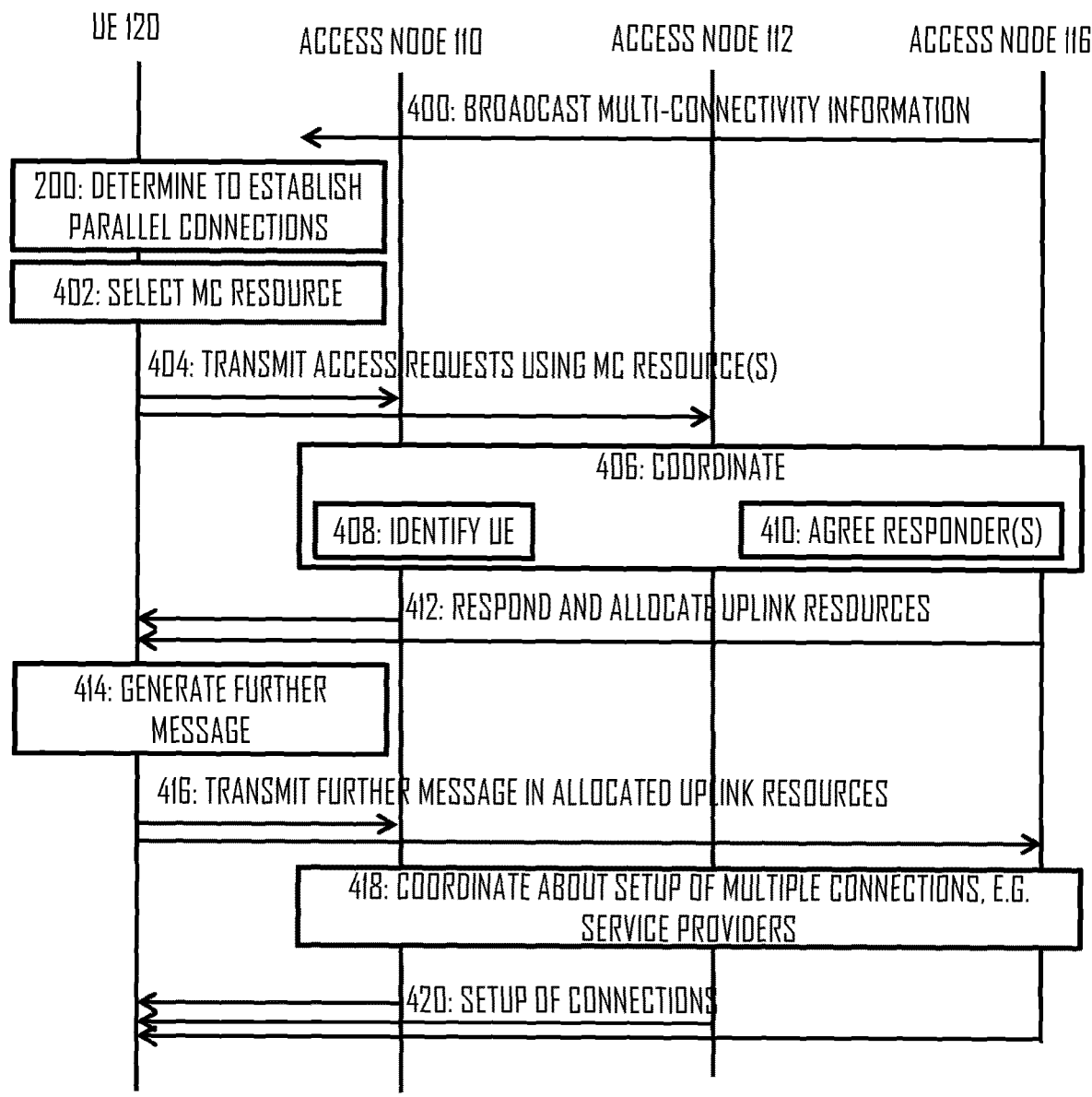
FIG. 4 illustrates a signalling diagram of a procedure for requesting and coordinating first steps in establishment of a multi-connectivity service according to an embodiment of the invention.

Let us now describe some embodiments for initiating the establishment of the multi-connectivity for the terminal device 120. FIG. 4 illustrates a signalling diagram encompassing exchange of first messages in the establishment of the multi-connectivity. The embodiment of FIG. 4 applies a random access procedure to the establishment of the multi-connectivity. The random access procedure is used in many cellular communication systems for enabling the terminal device 120 to initiate connection with the radio access network, e.g. in the LTE.

The access nodes 110 to 116 may broadcast a control signal carrying multi-connectivity information periodically or otherwise regularly in respective cells 100 to 106 (step 400). The multi-connectivity information may be a part of broadcasted system information. The multi-connectivity information broadcasted by an access node may comprise at least one of the following: a resource pool dedicated for initiating the multi-connectivity, an indication of whether or not the access node supports the multi-connectivity, features of a multi-connectivity service provided by the access node, and selection criteria for use in block 200.

The resource pool may comprise at least one of the following: random access preambles dedicated for initiating the multi-connectivity, time and/or frequency resources dedicated for initiating the multi-connectivity, and channel(s) dedicated for initiating the multi-connectivity. The access node may further broadcast another resource pool that indicates resources for initiating another type of connectivity, e.g. a single radio connection. A terminal device choosing to initiate the multi-connectivity may be mandated to use the resource pool dedicated for the multi-connectivity use, and a terminal device choosing to initiate a single radio connection may be mandated to use the other resource pool. As a consequence, the selection of the resource pool may be used as an early indicator of which type of connection the terminal device is requesting. In an embodiment, access nodes providing the multi-connectivity service together, e.g. a macro cell access node and local area access nodes controlled by the macro cell access node, may provide the same resource pool. The access nodes may form an ultra-dense network (UDN) envisaged as one network topology in the 5G system. In the UDN scenario, access nodes may support various or multiple radio access technologies and operate on different spectral bands. One purpose of the UDN deployment is to provide flexibility and capability of serving various traffic demands in densely populated areas and in connection with high concentrations of terminal devices, e.g. malls, universities, and sports events. The UDN may employ a large number of local area access nodes each with a very limited range, e.g. about ten meters or less. The high number of local area access nodes provide the service capability and flexibility through traffic offloading, for example. In another embodiment, different access nodes may provide different resource pools.

In another embodiment, the different resource pools may have different associations with the provided services. For example, one resource pool may be associated with a higher reliability radio connection service while another pool is associated with a lower reliability radio connection service. A terminal device needing high reliability service may then use the one resource pool while a terminal device not setting any requirements for the reliability may select the other resource pool. As another example, one resource pool may be associated with a lower latency radio connection service while another pool is associated with a higher latency radio connection service. A terminal device needing a low-latency service may then use the one resource pool while a terminal device not setting any requirements for the latency may select the other resource pool. In yet another example, there may be a dedicated resource pool associated with both high reliability and low latency requirement. Such solutions for high reliability and/or low latency specific resource pools may be used, for example, in connection with an ultra-reliable low-latency communications (URLLC) service specified for 5G systems, for example. One 3GPP work study focuses on scenarios and requirements for next generation access technologies and considers URLLC as one scheme to be supported in the future wireless networks. Examples for typical use cases of URLLC include industrial control, tactile Internet, and the like, as described in 3GPP documents about new services and markets technology enablers.

With respect to the low-latency in the URLLC service, the URLLC aims for user plane latency as low as 0.5 ms (milliseconds) for uplink and for downlink. The user plane latency may be defined as a time duration to successfully deliver an application layer packet/message from a radio protocol layer ⅔ service data unit (SDU) ingress point to a radio protocol layer ⅔ SDU egress point via a radio interface in both uplink/downlink. A context may be such that neither a transmitter nor a receiver is in a discontinuous transmission/reception state.

With respect to the reliability related to the URLLC, the supported reliability may be up to be $10e^{-5}$ (packet error rate) within 1 ms for use cases such as eHealth surgical robots operating mainly in very deep indoor environment. This reliability performance may be supported by user-experienced data rate in the order of 300 Mbps or more.

The features of the multi-connectivity service broadcasted by the access node may comprise at least one of the following: a role of the access node in the multi-connectivity service, e.g. whether the access node operates a primary cell having a primary control over the multi-connectivity or a secondary cell operating the multi-connectivity service under a control of a primary cell, an indicator of a radio access technology (RAT), and a local cell cluster consisting of one or more local neighbouring cells available for establishing the multi-connectivity.

The selection criteria may comprise at least one of the following: a threshold defining a number of cells the terminal device 120 has to be able to detect in order to request for the multi-connectivity, preferences of an operator of the cellular communication system for the multi-connectivity service, a current status of the terminal device 120, measured channel conditions towards more than one detected cells, capability of the terminal device above a minimum class, sufficient mobile battery power.

In block 200, the terminal device may use the selection criteria received in the control signal from the access nodes and/or internal selection criteria of the terminal device when determining whether or not to initiate the multi-connectivity. The internal selection criteria may include at least one of the following: capability of the terminal device for the multi-connectivity, a subscription type of the terminal device with respect to the cellular communication system (e.g. a priority class), connectivity preferences of the terminal device, latency and/or reliability requirements of the terminal device, bandwidth requested by the terminal device, special services required by the terminal device.

In an embodiment, the terminal device determines to request for the multi-connectivity if a condition for said establishing exceeds one or more predefined thresholds. For example, the terminal device determines to request for the multi-connectivity if it is able to detect a higher number of access nodes supporting the multi-connectivity than a value of the above-described threshold. In another example, the terminal device determines to request for the multi-connectivity if the latency requirements of the terminal device exceed a latency threshold, e.g. the latency requirements are stricter than the threshold value. In an embodiment, the terminal device may request for the multi-connectivity, if it requires latency as low as 0.5 ms (see URLLC above). If the terminal device sets more loose requirements for the latency, it may request for a single connection. In another example, the terminal device requests for the multi-connectivity, if it requires reliability up to $10e^{-5}$ in terms of packet error rate. If the terminal device has less strict reliability requirements, e.g. $10e^{-3}$, it may select a single connection. In another example, the terminal device determines to request for the multi-connectivity if the priority class of the terminal device is higher than a threshold priority class. In yet another example, the terminal device determines to request for the multi-connectivity if measured channel conditions towards a plurality of access nodes exceed a determined channel quality threshold. The channel quality may be evaluated by using one or more of the following channel quality metrics: a received signal strength indicator (RSSI), reference signal reception power (RSRP), path loss, signal-to-noise ratio (SNR), signal-to-interference-plus-noise ratio (SINR), and a channel rank (a number of orthogonal spatial channels). In yet another example, the terminal device determines to request for the multi-connectivity if the remaining capacity of the battery of the terminal device is above a determined threshold. In yet another example, the terminal device determines to request for the multi-connectivity, if the capability of the terminal device is above the minimum class required for the multi-connectivity service. Any combination of these threshold comparisons may be used in block 200, and the determination to request for the multi-connectivity may be made when all the threshold comparisons result in a determination that the threshold is exceeded.

Upon determining to request for the multi-connectivity, the terminal device may determine a communication resource from the resource pool dedicated for the multi-connectivity in block 402. The terminal device may, for example, select a random access preamble, time and/or frequency resources and/or channel dedicated for the multi-connectivity use. The terminal device may also determine one or more access nodes to which to transmit the access request and select the communication resource(s) from the resource pool of said one or more access nodes. A selection criterion for selecting the one or more access nodes may be a channel condition or a role of the access node(s) in the multi-connectivity service. The terminal device may select one or more access nodes that provide the best channel conditions with the terminal device. The terminal device may select the one or more access nodes that include the primary cell for the multi-connectivity service. The one or more access nodes may form a subset of access nodes detected by the terminal device to provide the multi-connectivity service. In the example of FIG. 4, the terminal device selects the access nodes 110 and 112 but not the access node 116 although the access node 116 is capable of providing the terminal device with the multi-connectivity service.

In step 404, the terminal device transmits multiple access requests to the selected access nodes. In an embodiment, the terminal device uses the same resource in the different access requests, e.g. the same random access preamble, and transmits the multiple access requests on respective random access channels of the access nodes 110, 112. In some cases, the different or multiple access requests may be seen as different or multiple instances of the same request message towards different or multiple access nodes. The terminal device may be configured to transmit the access requests within a preconfigured time duration. Accordingly, the transmissions of the access requests may be aligned with one another with some time offset allowed, wherein the offset is defined by the preconfigured time duration. The offset may be necessary in situations where the random access channel transmission resources are not time-aligned between the access nodes 110, 112. For example, 5G systems may comprise access nodes that employ beamforming for uplink and downlink channels such that the access nodes sweep a narrow radio beam in their coverage areas. Accordingly, the uplink/downlink channel of the radio beam may not be available at the same time in all locations within the cell. Such a solution may be needed on higher frequencies such as on millimetre wave (mmWave) frequencies to concentrate sufficient power to the radio beam to reach the cell edge. The terminal device may also use such a sweeping beam solution to communicate with different access nodes at different timings.

The terminal device 120 may manage the transmissions of the access requests by selecting uplink transmission timings of the access requests such that the access requests are transmitted within the preconfigured time duration, counted from the transmission timing of the first access request to the transmission timing of the last access request. The terminal device may receive the preconfigured time duration value in block 400.

The access nodes 110, 112 receive the parallel access requests in step 404. Upon receiving the access request, the access nodes 110, 112 may determine the resource(s) used for transmitting the access request. If the resource is from the resource pool dedicated to the multi-connectivity use, the access nodes 110, 112 may determine that the access request is a request for the multiple parallel connections and start coordination for the establishment of the multiple radio connections (block 406). Block 406 may comprise exchange of information between the access nodes 110, 112, 116 capable of providing the multi-connectivity service. The access nodes involved in the coordination may be selected on the basis of preconfigured cell cluster information and/or information provided by the terminal device. For example, only access nodes of the cell cluster that are capable of providing the multi-connectivity service may be involved in the coordination. As another example, the terminal device may select and indicate the access nodes it has selected to provide the service, or access nodes the terminal device has detected to be capable of providing the service.

In an embodiment of block 406, the access nodes identify the terminal device (block 408). The identifying may be based on the preconfigured time duration for transmitting the access requests. The access nodes 110, 112, 116 may exchange the reception timings of the access requests received in step 404. If the timings are within the preconfigured time duration, the access nodes 110, 112, 116 may agree that the same terminal device sent the access requests. This is an example of coarse identification that may be called contention resolution. In another embodiment where the terminal device 120 uses the same resource for the multiple access nodes, e.g. the same random access preamble, the access nodes may carry out the contention resolution with a higher accuracy. This results from that the access nodes 110, 112, 116 may exchange the random access preamble received and the reception timing, and if the reception timings associated with the same random access preamble are within the preconfigured time duration, it may be concluded that the random access preambles originate from the same terminal device. It may be advantageous in a situation where some of the access request are suspected to contention by another terminal device. An access request not contented may be used as a reference to identify the terminal device 120.

In yet another embodiment, the access node(s) may assign a dedicated resource to the terminal device 120 for use in the access request. The resource may be dedicated only to the terminal device 120 and, therefore, receiving the access requests in the dedicated resource, the terminal device may be identified explicitly in block 408. In an embodiment, the terminal device may use the dedicated resource only for one of the access requests and use a random resource of the resource pool for another one of the access requests of step 404. In such an embodiment, block 408 may comprise identifying the terminal device explicitly on the basis of the dedicated resource and associating the other access requests to the terminal device by using the preconfigured time duration, e.g. by associating access requests that are received within the preconfigured time duration around the access request using the dedicated resource.

This early identification of the terminal device or at least the contention resolution may expedite the configuration of the multi-connectivity service. In general, upon the access node(s) detect that the access request relates to the multi-connectivity service, the access nodes may start the coordination of the multi-connectivity service very early, even upon receiving the first message of the random access procedure.

The coordination may involve even one or more access nodes 116 that did not receive the access request in step 404. In an embodiment, the coordination is carried out amongst access nodes of a determined cell cluster, e.g. an UDN cluster. The access nodes may then determine which one or more of the access nodes 110, 112, 116 provide the service and/or respond to the access request (block 410). The responding access node may comprise an access node 110 that received the access request in step 404 and/or an access node 116 that did not receive the access request. The decision of the responding device(s) may depend on the network loading, capability of the access nodes for the multi-connectivity service, channel conditions towards the terminal device, etc. In an embodiment, the decision of whether or not an access node will respond to the terminal device is made on the basis of at least one of the following criteria: whether the access node received the access request from the terminal device directly or indirectly via another access node, a number of messages exchanged with the one or more access nodes in block 406, and contents of messages exchanged with the one or more access nodes. For example, if the access node received the access request directly from the terminal device, the access node may respond, otherwise not. For example, if the access node receives more than one indication from the other access nodes about the other access nodes also receiving the access request, the access node may refrain from responding. The contents used as the criteria may include the traffic load of the access nodes, for example. If the access node has a lower traffic load than one or more of the other access nodes, the access node may respond to the terminal device. In yet another example, an access node that received an indication message of a received access request from another access node but did not receive any access request within the preconfigured time duration corresponding to the reception timing indicated in the received indication message may respond to terminal device. Accordingly, the terminal device may receive the response from an access node to which it did not transmit the access request. In yet another embodiment, the coordination of the response(s) may comprise an access node indicating whether or not the access node will response to the received access request, wherein the indication may be included in an indication message exchanged between the access nodes. Such an indication may be a 1-bit indication or the access node may indicate explicit contents of the response, e.g. uplink communication resources to be allocated to the terminal device and/or a temporary identifier assigned to the terminal device. Such exchange of explicit contents may facilitate the identification of the terminal device, if the explicit identity of the terminal device has not yet been established.

In step 412, upon agreeing the responding access nodes the responding access nodes allocate an uplink transmission resource (e.g. a time-frequency resource) to the terminal device for transmission of a further message. The allocation may further comprise allocating a transport block size, modulation and coding scheme, and/or a temporary identifier to the terminal device.

After transmitting the access request, the terminal device may start monitoring for a response from a plurality of access nodes. In an embodiment, the terminal device transmits the access request to a first subset of a plurality of access nodes and monitors for the response from a second subset of the plurality of access nodes. Each subset may comprise a plurality of access nodes. The first and second subsets may comprise the same access nodes, partially same and partially different access nodes, or mutually exclusive access nodes.

Upon receiving the uplink resource allocation(s) in step 412, the terminal device may generate the further message in block 414. The further message may be provided with more communication resources than available to the access request and, thus, the further message may carry further information with respect to the information carried by the access request. For example, the further information may comprise a unique identifier of the terminal device 120. In another example, the further information comprising an identifier derived from the unique identifier of the terminal device. In an embodiment, the identified is a part of the full unique identifier. In another embodiment, the identifier is derived from the unique identifier by using a hash function mapping bits of the unique identifier to a shorter bit combination. In general, the identifier comprised in the further information may be shorter than the unique identifier. In another embodiment, the further information comprises identifiers of at least some of the cells the terminal device has detected to be capable currently providing the terminal device 120 with the multi-connectivity service. The further information may indicate identifier of all cells the terminal device has detected to be capable currently providing the terminal device 120 with the multi-connectivity service.

In step 416, the terminal device transmits the further message in the uplink communication resources allocated in step 412. Upon receiving the further message from the terminal device in step 416, the access nodes 110, 116 may coordinate the setup of the multi-connectivity service in block 418. Block 418 may comprise an access node 110, 116 sending an indication or a request as how to respond or to provide the terminal device with the multi-connectivity service, e.g. together with some or all of the access nodes indicated by an identifier contained in the further message. The access nodes sending the indication and/or receiving the request may be configured to keep involved in providing the multi-connectivity service. This may involve keeping the access nodes posted about all the messages exchanged between the access nodes regarding the configuration of the multi-connectivity service. An access node sending the request and, further, receiving at least one indication from other access nodes may be allowed to pull out of providing the multi-connectivity service or only be involved in providing the multi-connectivity service with a best-effort commitment. This may be understood as the capability of changing the provision of the service dynamically on the fly. In general, the access nodes coordinate the multiple access nodes that are configured to provide the terminal device with a radio connection. The actual selection of the serving access nodes may be carried out in various ways, e.g. the selection may be made by a macro cell access node. In steps 420, the selected service providers start setup of radio connections with the terminal device.

In an embodiment, the access request is provided with more transmission resources than resources needed for transmitting the random access preamble. The terminal device may use these resources to include an identifier of the terminal device in the contents of the access request. The identifier may be an identifier already allocated to the terminal device before the inactive state, e.g. a radio network temporary identifier (RNTI) configured to the terminal device to identify the terminal device within a cluster of local area cells or in a tracking area. In another embodiment, the terminal device may use the additional space to transmit an identifier of those access nodes to which the terminal device transmitted the access requests. In the embodiment of FIG. 4, the access request transmitted to the access node 110 may comprise an identifier of the access node 112 as such information. The access node 110 may use this information in block 406, e.g. in the selection of access nodes to which to transmit the indication of the received access request. It may not be necessary to transmit the indication, or some contents of the indication, to the access node 112 because the access node 112 may readily be aware that the access node 110 received the access request, too.

In an embodiment, the transmission timings of the responses transmitted in step 412 may also be aligned such that all the response are transmitted within a determined time duration which may be the same as or different from the preconfigured time duration associated with the access request in step 404.

In an embodiment, uplink transmission resources may be allocated such that the terminal device transmits the further message(s) in step 416 within a determined time duration which may be the same as or different from the other time durations described above. This may allow for the contention resolution in block 418 if not carried out in block 406.

In an embodiment, the terminal device may transmit the multiple further messages in step 416 such that the different further messages carry different information. For example, the terminal device may transmit the identifier of the terminal device to the access node 110 and the identifiers of the detected access nodes to the access node 116. The access nodes 110, 112, 116 may then aggregate and share this information in block 418.

In an embodiment where there is no dedicated random access preamble available to the terminal device, the terminal device may select one of the available random access preambles by using a mapping function that is unique to the terminal device. The mapping function may map a combination of an identifier of the terminal device and an identifier of the selected access node to a random access preamble. This may reduce the collision probability because different terminal devices use different identifier combinations in the mapping function.

In an embodiment, an access node may monitor for uplink resources allocated by another access node in step 412. Accordingly, the access node 112 may monitor for the resources allocated by the access node 110 and receive the further message in step 416. The access node 112 may then indicate the reception of the further message and the contents of the further message to the other access nodes in block 418 which provides an extra layer of reliability to the procedure, e.g. in a case where the access node 110 is not capable of receiving the further message.

Figure 5:
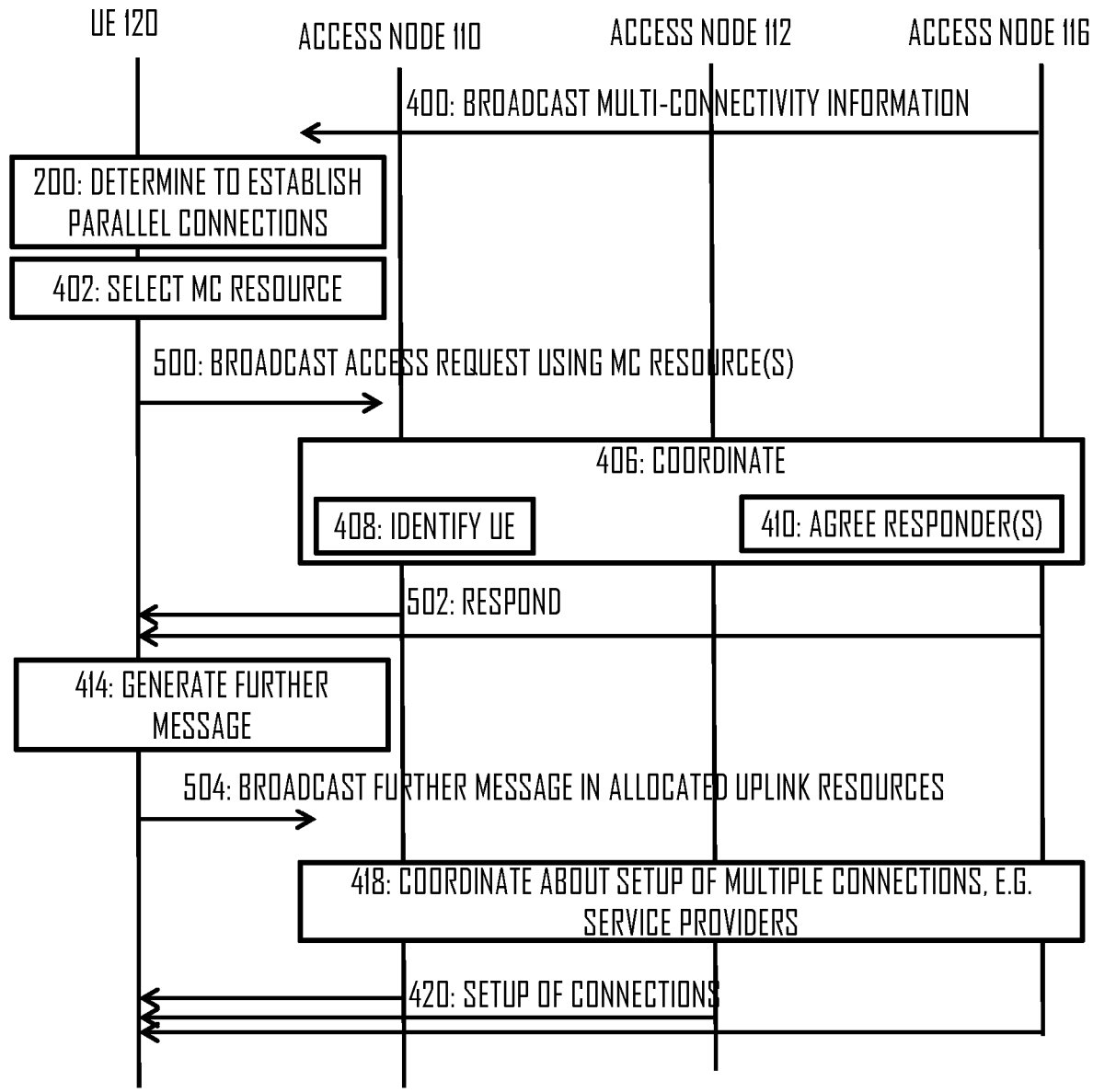
FIG. 5 illustrates a signalling diagram of a procedure for requesting and coordinating first steps in establishment of a multi-connectivity service according to another embodiment of the invention.

In the embodiment of FIG. 4, the terminal device may send the access request and the further message in unique transmission resources of the selected access nodes 110, 112. FIG. 5 illustrates an embodiment where the terminal device uses a broadcast channel to broadcast the access request (step 500). The broadcast channel may be common to a plurality of access nodes within the UDN or otherwise within a local area, for example. However, the different access nodes may have different broadcast channels but aligned such that the terminal device can broadcast the access request on all channels within the preconfigured time duration. Such an offset time alignment of the broadcast channels may be needed when the above-described beamforming is applied by the terminal device. The broadcast channel may be dedicated to the terminal device beforehand to eliminate collision and enable the early identification of the terminal device in block 408.

The broadcast access request may include an identifier of the terminal device, e.g. a unique identifier of the terminal device to enable the identification of the terminal device in block 408. The coordination may be carried out substantially in the above-described manner. In step 502, the access nodes 110, 116 may respond to the access request. The response may comprise acknowledgment of the access request and/or an identifier assigned to the terminal device 120.

Additionally, or alternatively, the terminal device may broadcast the further message in the same manner as described above for the access request. Note that in a further embodiment, the terminal device broadcasts the access request but transmits the further message(s) as unicast messages.

Figure 6:
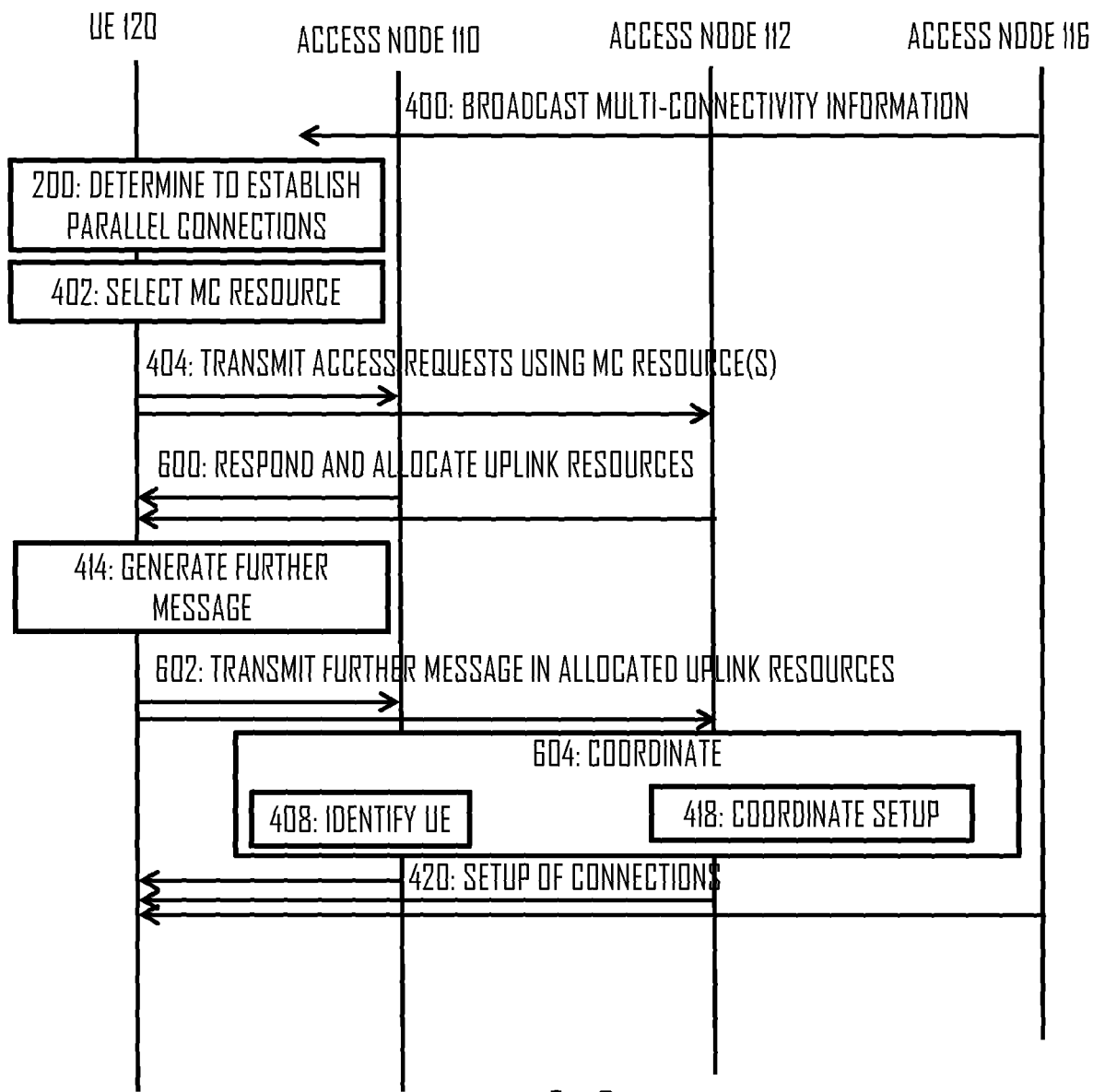
FIG. 6 illustrates a signalling diagram of a procedure for requesting and coordinating first steps in establishment of a multi-connectivity service according to yet another embodiment of the invention.

FIG. 6 illustrates an embodiment of the invention where the initial coordination of block 406 is omitted. In this embodiment, the terminal device 120 may carry out steps 200, 402, and 404 in the above-described manner and transmit the access request as a broadcast message or as a dedicated message to selected access nodes.

Upon receiving the access request in step 404, the access nodes 110, 112 receiving the access request respond to the access request without any coordination amongst the access nodes at this stage. The response may allocate the uplink resources for the further message in the above-described manner. The response may be transmitted in step 600, and the terminal device may proceed as described above in connection with FIG. 4, for example, by generating the further message and transmitting the further message in the allocated uplink transmission resources (step 602). Only after receiving the further message in step 602, the access nodes 110 to 116 may start coordinating (block 604) the multi-connectivity service (block 418) and/or carry out the contention resolution and/or the identification of the terminal device (block 408). Carrying out block 408 only at this stage may provide for more reliable identification with a lower overall processing overhead because block 408 is carried out only at one point and with more information available.

In this embodiment, the access nodes may not be aware of the other access nodes that responded to the terminal device in step 600. In an embodiment, the further message generated in block 414 and transmitted and received in step 602 contains information on the access nodes that responded to the terminal device in step 600. Only the access nodes that support the multi-connectivity service may be configured to respond to the access request in step 600. Accordingly, the information carried by the further messages may be used by the access nodes 110, 112 to determine the other access nodes with which to carry out the coordination in block 604. A macro cell access node may be included in the coordination at any case because of its supervisory control role. The macrocell access node, another access node or a network element may serve as an anchor point for the multi-connectivity service and carry out said supervisory control over the multi-connectivity service.

The embodiment of FIG. 6 may be equally applied to a solution where the access request and/or the further message are broadcasted by the terminal device.

As an alternative to using the resource pool dedicated exclusively to the establishment of the multi-connectivity service, the terminal device may have registered to use the multi-connectivity service as a default before transmitting the access request. Accordingly, the terminal device may use a conventional random access procedure by transmitting the access request only to a single access node (or to multiple access nodes). Upon detecting the access request or the further message directly from the terminal device or indirectly via another access node, and with the knowledge of the registration to the multi-connectivity service, an access node such as the macro cell access node may trigger the establishment of the multi-connectivity service.

Figure 7:
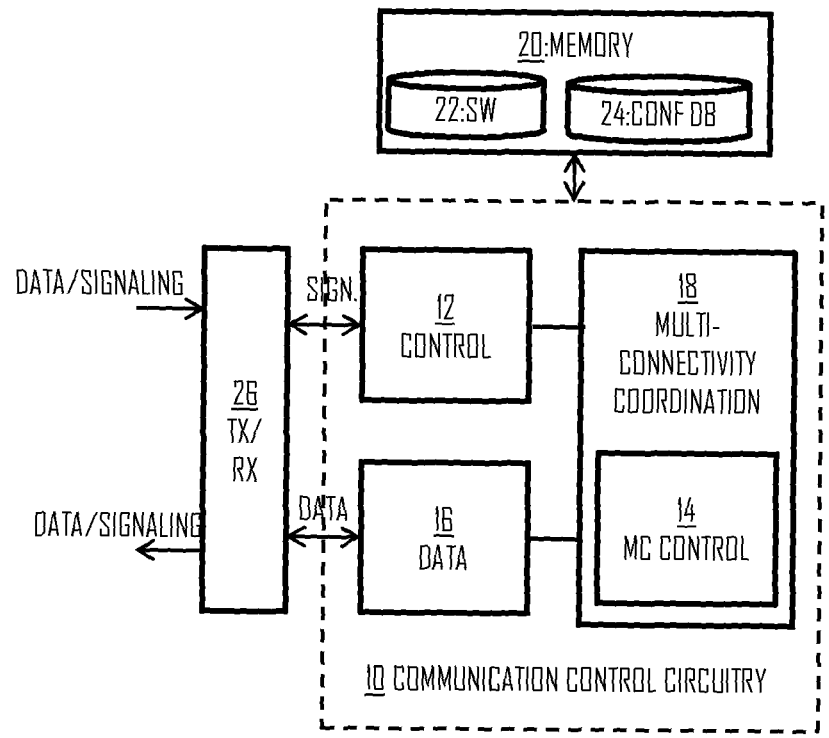
FIGS. 7 and 8 illustrate block diagrams of structures of apparatuses according to some embodiments of the invention.

FIG. 7 illustrates an apparatus configured to carry out the functions described above in connection with the access node, e.g. any one of the access nodes 110 to 116. The apparatus may be an electronic device comprising electronic circuitries. The apparatus may be the access node or it may be comprised in or be applicable to the access node. The apparatus may comprise a communication control circuitry 10 such as at least one processor, and at least one memory 20 including a computer program code (software) 22 wherein the at least one memory and the computer program code (software) are configured, with the at least one processor, to cause the apparatus to carry out any one of the embodiments of the access node described above.

The memory 20 may be implemented using any suitable data storage technology, such as semiconductor based memory devices, flash memory, magnetic memory devices and systems, optical memory devices and systems, fixed memory and removable memory. The memory may comprise a configuration database 24 for storing configuration data for communicating in a cell over a radio interface. For example, the configuration database 24 may store system information broadcasted by the access node in step 400, criteria for the establishment of the multi-connectivity service, criteria for responding to a received access request, rules for carrying out coordination in blocks 406, 418, and/or 604, criteria or parameters for providing the multi-connectivity service, etc.

The apparatus may further comprise a communication interface (TX/RX) 26 comprising hardware and/or software for realizing communication connectivity according to one or more communication protocols. The communication interface 26 may provide the apparatus with communication capabilities to communicate in the cellular communication system and enable communication with other access nodes and terminal devices, for example. The communication interface 26 may comprise standard well-known components such as an amplifier, filter, frequency-converter, (de) modulator, and encoder/decoder circuitries and one or more antennas. The communication interface 26 may comprise radio interface components providing the apparatus with radio communication capability in the cell.

In an embodiment of FIG. 7, at least some of the functionalities of the access node may be shared between two physically separate devices, forming one operational entity. Therefore, the apparatus may be seen to depict the operational entity comprising one or more physically separate devices for executing at least some of the described processes. Thus, the apparatus of FIG. 7, utilizing such a shared architecture, may comprise a remote control unit (RCU), such as a host computer or a server computer, operatively coupled (e.g. via a wireless or wired network) to a remote radio head (RRH) located in a base station site. In an embodiment, at least some of the described processes of the access node may be performed by the RCU. In an embodiment, the execution of at least some of the described processes may be shared among the RRH and the RCU. In such a context, RCU may comprise the components illustrated in FIG. 7, and the communication interface 26 may provide the RCU with the connection to the RRH. The RRH may then comprise radio frequency signal processing circuitries and antennas, for example.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

Referring to FIG. 7, the communication control circuitry 10 may comprise a transmission controller 12 configured to carry out control plane signalling with the terminal device(s) in one or more cells managed by the access node 110. The transmission controller 12 may communicate with the terminal devices in the context of the random access procedure, for example. For that purpose, the transmission controller 12. In general, the transmission controller may carry out control plane signalling with the terminal devices. The communication control circuitry 10 may further comprise a data communication circuitry 16 configured to carry out user plane or data plane communication with the terminal devices.

The communication control circuitry 10 may further comprise a multi-connectivity coordination circuitry 18 configured to manage the multi-connectivity services in the access node. The multi-connectivity coordination circuitry may be configured to process the received access requests requesting for the establishment of the multi-connectivity service and any associated coordination with the other access nodes and messaging with the terminal devices with respect to the multi-connectivity service in steps 300 to 304, 400, 404, 406, 412, 416, 418, 420, 500, 502, 504, 600, 602, 604 described above. In some embodiments, the multi-connectivity coordination circuitry 18 may comprise a multi-connectivity (MC) control circuitry 14 configured to have the supervisory role in the multi-connectivity service, e.g. the anchor point of the service. The MC control circuitry may select the access nodes to provide the multi-connectivity service, select the responding access nodes that respond to the access request(s), etc. The multi-connectivity coordination circuitry 18 may use the transmission controller to carry out the message exchange with the terminal device and/or with the other access nodes in connection with the establishment of the multi-connectivity service. Upon establishing the multi-connectivity service, the multi-connectivity coordination circuitry 18 may use the data communication circuitry 16 to exchange data messages with the terminal device provided with the service.

Figure 8:
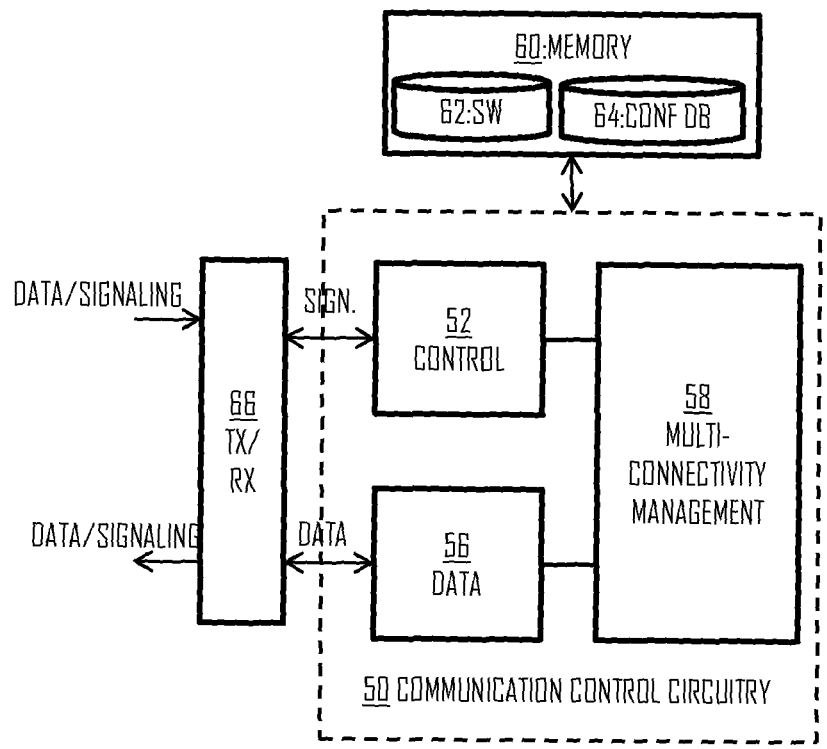

FIG. 8 illustrates an apparatus configured to carry out the functions described above in connection with the terminal device 120. The apparatus may be an electronic device comprising electronic circuitries. The apparatus may be the terminal device 120 or it may be comprised in or be applicable to the terminal device 120. The apparatus may comprise a communication control circuitry 50 such as at least one processor, and at least one memory 60 including a computer program code (software) 62 wherein the at least one memory and the computer program code (software) are configured, with the at least one processor, to cause the apparatus to carry out any one of the embodiments of the terminal device described above.

The memory 60 may be implemented using any suitable data storage technology, such as semiconductor based memory devices, flash memory, magnetic memory devices and systems, optical memory devices and systems, fixed memory and removable memory. The memory may comprise a configuration database 64 for storing configuration data for communicating with one or more access nodes over a radio interface. For example, the configuration database 64 may store system information received from one or more of access nodes detected by the terminal device in step 400, criteria for requesting for the establishment of the multi-connectivity service, resource pools described above, etc.

The apparatus may further comprise a communication interface (TX/RX) 66 comprising hardware and/or software for realizing communication connectivity according to one or more communication protocols. The communication interface may provide the apparatus with communication capabilities to communicate in the cellular communication system and enable communication with the access node(s) and, in some embodiments, other terminal devices. The communication interface 66 may comprise standard well-known components such as an amplifier, filter, frequency-converter, (de)modulator, and encoder/decoder circuitries and one or more antennas. The communication interface 66 may comprise radio interface components providing the apparatus with radio communication capability in the cell.

The communication control circuitry 50 may comprise a transmission controller 52 configured to carry out control plane signalling with access nodes. The transmission controller may carry out the above-described communication in steps 400, 404, 412, 416, 420, 500, 504, 600, and 602. The communication control circuitry 50 may further comprise a data communication circuitry 56 managing data communication in the user plane after the multi-connectivity service has been established.

The communication control circuitry 50 may further comprise a multi-connectivity management circuitry 58 configured to manage the establishment and operation of the multi-connectivity service in the terminal device 120. The multi-connectivity management circuitry may be configured to carry out block 200 and to control the transmission controller in execution of blocks 202 and 204. Regarding the embodiments of FIGS. 4 to 6, the multi-connectivity management circuitry may be configured to carry out functions described above in connection with blocks 402, 414 and to cooperate with the transmission controller in communication with the access nodes as described in connection with steps 400, 404, 412, 416, 420, 500, 502, 504, 600, and 602.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 6 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 6 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
   determining, autonomously by a terminal device of a wireless communication system, to request for establishment of parallel connections with multiple access nodes;
   transmitting, by the terminal device, at least one access request to a plurality of access nodes, the at least one access request is transmitted as a part of a random access procedure on a communication resource selected by the terminal device from a first resource pool among a plurality of preconfigured resource pools associated with random access; and
   receiving, by the terminal device at least one response to the at least one access request from at least one radio access node, wherein the response contains information related to establishment of the parallel connections;
   wherein the first resource pool contains resources dedicated for use in connection with access requests for establishing the parallel connections with multiple access nodes.

2. The method of claim 1, wherein the first resource pool comprises random access preambles dedicated for use in connection with access requests for establishing the parallel connections with multiple access nodes, and wherein the plurality of preconfigured resource pools associated with random access comprise at least a second resource pool for random access preambles dedicated to another type of access request.

3. The method of claim 1, wherein the first resource pool comprises at least one of time resources and frequency resources dedicated for use in connection with access requests for establishing the parallel connections with multiple access nodes, and wherein the plurality of preconfigured resource pools associated with random access comprise at least a second resource pool for at least one of time resources and frequency resources dedicated to another type of access request.

4. The method of claim 1, wherein the first resource pool contains resources dedicated to at least one of a high-reliability and low-latency service, and wherein the plurality of preconfigured resource pools further comprises at least a second resource pool containing resources dedicated to another type of service.

5. The method of claim 1, wherein the terminal device stores a context for at least one radio connection with the at least one access node when carrying out said determining but is in an inactive state with respect to the at least one radio connection.

6. The method of claim 1, wherein the terminal device makes the determination to request for the establishment of the parallel connections with the multiple access nodes by using at least one of the following determination criteria: a number of detected access nodes, control signals received from at least one of the plurality of access nodes, radio access technology supported by the multiple access nodes, radio access frequency supported by the multiple access nodes, capability of the terminal device for the parallel connections with the multiple access nodes, a subscription type of the terminal device with respect to the wireless communication system, connectivity preferences of the terminal device and/or an operator of the wireless communication system, latency requirements of the terminal device.

7. The method of claim 1, wherein the terminal device determines to establish the parallel connections if a condition for said establishing exceeds one or more pre-defined thresholds.

8. The method of claim 1, wherein the at least one access request is a first message of the random access procedure, the method further comprising after receiving the at least one response: transmitting a further message to at least one of the plurality of access nodes, wherein the further message carries further information with respect to information carried by the at least one access request.

9. The method of claim 8, wherein the further information comprises at least a subset of identifiers of the plurality of access nodes.

10. The method of claim 8, wherein the further message is transmitted to an access node from which the terminal device received none of the at least one response.

11. The method of claim 10, wherein the terminal device is configured to receive the at least one response from an access node to which the terminal device directed none of the at least one access request.

12. The method of claim 1, wherein the at least one access request is a single access request broadcasted by the terminal device.

13. The method of claim 12, wherein the access request carries an identifier derived from a unique identifier of the terminal device.

14. An apparatus comprising:
at least one processor, and
at least one memory comprising a computer program code, wherein the processor, the memory, and the computer program code are configured to cause the apparatus to:
determine autonomously to request for establishment of parallel connections with multiple access nodes;
cause transmission of at least one access request to a plurality of access nodes, the at least one access request is transmitted as a part of a random access procedure on a communication resource selected by the terminal device from a first resource pool among a plurality of preconfigured resource pools associated with random access; and
receive at least one response to the at least one access request from at least one radio access node, wherein the response contains information related to establishment of the parallel connections;
wherein the first resource pool contains resources dedicated for use in connection with access requests for establishing the parallel connections with multiple access nodes.

15. The apparatus of claim 14, wherein the first resource pool comprises random access preambles dedicated for use in connection with access requests for establishing the parallel connections with multiple access nodes, and wherein the plurality of preconfigured resource pools associated with random access comprise at least a second resource pool for random access preambles dedicated to another type of access request.

16. The apparatus of claim 14, wherein the first resource pool comprises at least one of time resources and frequency resources dedicated for use in connection with access requests for establishing the parallel connections with multiple access nodes, and wherein the plurality of preconfigured resource pools associated with random access comprise at least a second resource pool for at least one of time resources and frequency resources dedicated to another type of access request.

17. The apparatus of claim 14, wherein the first resource pool contains resources dedicated to at least one of a high-reliability and low-latency service, and wherein the plurality of preconfigured resource pools further comprises at least a second resource pool containing resources dedicated to another type of service.

18. A non-transitory computer-readable storage medium comprising instructions stored thereon that, when executed by at least one processor, are configured to cause a computing system to perform the method of:
determining, autonomously by a terminal device of a wireless communication system, to request for establishment of parallel connections with multiple access nodes;
transmitting, by the terminal device, at least one access request to a plurality of access nodes, the at least one access request is transmitted as a part of a random access procedure on a communication resource selected by the terminal device from a first resource pool among a plurality of preconfigured resource pools associated with random access; and
receiving, by the terminal device at least one response to the at least one access request from at least one radio access node, wherein the response contains information related to establishment of the parallel connections;
wherein the first resource pool contains resources dedicated for use in connection with access requests for establishing the parallel connections with multiple access nodes.

* * * * *